(12) United States Patent
Podduturi et al.

(10) Patent No.: US 8,595,241 B2
(45) Date of Patent: Nov. 26, 2013

(54) SYSTEM AND METHOD FOR AUGMENTING DIGITAL MEDIA WITH CUSTOM CONTENT

(75) Inventors: Anil Reddy Podduturi, New York, NY (US); Scott Ari Blumenthal, New York, NY (US); Brian Steven Schmitz, Brooklyn, NY (US); Patrick Allen Hensley, Jersey City, NJ (US); Philip Lawrence Schanely, Millstone Township, NJ (US); Upendra Shardanand, New York, NY (US)

(73) Assignee: Newscred, Inc., New York, NY (US)

( * ) Notice: Subject to any disclaimer, the term of this patent is extended or adjusted under 35 U.S.C. 154(b) by 475 days.

(21) Appl. No.: 12/483,451

(22) Filed: Jun. 12, 2009

(65) Prior Publication Data

US 2010/0106733 A1    Apr. 29, 2010

Related U.S. Application Data

(60) Provisional application No. 61/074,647, filed on Jun. 22, 2008.

(51) Int. Cl.
*G06F 17/30*  (2006.01)

(52) U.S. Cl.
USPC .......................................................... 707/754

(58) Field of Classification Search
USPC ........... 707/753, 754, 770, 803, 804; 715/273
See application file for complete search history.

(56) References Cited

U.S. PATENT DOCUMENTS

| | | | |
|---|---|---|---|
| 2005/0289468 A1* | 12/2005 | Kahn et al. ..................... | 715/738 |
| 2007/0078772 A1* | 4/2007 | Dadd ............................... | 705/52 |
| 2009/0013244 A1* | 1/2009 | Cudich et al. .................. | 715/234 |
| 2009/0199242 A1* | 8/2009 | Johnson et al. ................. | 725/46 |
| 2009/0265331 A1* | 10/2009 | Chandrasekar et al. .......... | 707/5 |

OTHER PUBLICATIONS

Tom Yeh et al., Searching the Web with Mobile Images for Location Recognition, 2004, IEEE, 6 pages.*

* cited by examiner

*Primary Examiner* — Jean B Fleurantin
(74) *Attorney, Agent, or Firm* — Joseph D. Eng, Jr.; King & Spalding LLP

(57) ABSTRACT

A system and method for enhancing the number of page views of a web site or other digitally distributed interactive medium. A custom content hosting service allows a publisher to augment the contents of its own site with additional pages. The custom content hosting service provides content based on a topic supplied by the publisher, extracting data from a database of generic content. Generic content may include, for example, news feeds and news archives; news and archive photographs; links to blogs and other sites; etc. The publisher may customize the look and feel of the hosted pages to allow seamless integration into its own site.

5 Claims, 4 Drawing Sheets

SYSTEM AND METHOD FOR AUGMENTING DIGITAL MEDIA WITH CUSTOM CONTENT

CROSS-REFERENCE TO RELATED APPLICATIONS

This application claims priority to U.S. Provisional Application Ser. No. 61/074,647, filed Jun. 22, 2008. This patent application is related to U.S. patent application Ser. No. 11/260,720, filed Oct. 27, 2005; Ser. No. 60/821,566, filed Aug. 5, 2006; Ser. No. 11/463,061, filed Aug. 8, 2006; Ser. No. 11/531,306, filed Sep. 13, 2006; PCT/US2006/060149, filed Oct. 23, 2006; Ser. No. 11/833,442, filed Aug. 3, 2007; Ser. No. 11/848,134, filed Aug. 30, 2007; and Ser. No. 12/027,700, filed Feb. 7, 2008; all of which are incorporated herein by reference.

FIELD OF THE INVENTION

This invention relates to digitally distributed interactive media, and more specifically to the automatic generation of additional content to enhance existing web pages and other digitally distributed interactive media.

BACKGROUND OF THE INVENTION

The economic success of digitally distributed interactive media depends on the availability of attractive content to maximize the number of page views. In general, increasing page views maximizes user exposure to a site and therefore helps build a user base. Moreover, many commercial sites generate revenue through the placement of advertising on a per-view basis, i.e., the advertising revenue depends on the number of times a page containing advertisements is viewed. In the following discussion, the term "content" is used to generally indicate any kind of information that a user may perceive sensorially, including for example text, diagrams, photographs, sound, animations, video, interactive games, three-dimensional virtual reality environments, and similar information. The term "page" refers to content represented by a data structure suitable for digital storage and transmission, and for presentation to a user through a sensorial medium, such as the video display of a computer connected to the internet. A common example is a web page encoded in a language such as HTML. The term "site" refers to a collection of pages which a user may navigate by tools such as browsing or searching. A common example is a web site including web pages. While the following discussion will focus on the specific example of internet web sites, it is understood that the same concepts may be applied to other media.

The number of pages viewed by users can be increased through several measures. For example, one may increase the number of pages by adding new content to the site. Users already visiting the site will naturally be captured by the new content, for example through links on pages they are currently browsing. Moreover, more content brings in more traffic from search engines. Alternatively, one may add additional content to existing pages, for example in the form of sidebars covering topics related to the page currently being browsed. The additional content improves the user experience and helps retain users.

As an alternative to adding entirely new content, one may create additional links between existing pages. This facilitates the user's exploration of the site. For example, if a user has an interest in a topic that is related to the page currently being viewed, a direct link to another page covering that topic obviates the need for using an external search engine or other source of information. This approach "engineers" a user experience that encourages browsing and user retention. A similar result may be obtained by adding a "search box" that allows the user to search for a particular topic within the site rather than on the entire web. In both cases, user traffic may be contained within the publisher's site. Moreover, traffic may be redirected toward pages that would otherwise be rarely visited, and additional advertisement revenue may be generated by reviving such "dormant" content.

One problem with all of the above measures to increase page views is that they generally involve a substantial cost. Additional content, whether it is embedded within an existing page or formatted as a separate page, must be generated in-house or acquired from third parties. Moreover, content must be filtered and arranged in a way that is attractive to the users of the site. For example, the user of a site dedicated to politics will naturally be interested in political news and related information, arranged in relation to the content of the page that he or she is currently viewing. Finally, creating a network of links between pages involving related content also entails costs.

Proposed solutions to these problems have inherent shortcomings. For example, news aggregation tools may be used to build customized content centered around a given topic. However such tools require close integration with a publisher's own site, and also must be hosted within the site. On the other hand, there are self-service publishing tools that allow a publisher to easily construct a customized site. Self-service tools may also include a hosting service. However such tools do not provide facilities to automatically generate customized content.

Accordingly, there is a need for enhancing the content of web pages and other digitally distributed interactive media without the cost and complexity of measures currently used to maximize page views.

BRIEF DESCRIPTION OF THE DRAWINGS

Embodiments of the invention will now be described with reference to the appended drawings in which.

Drawings are only diagrammatic and not to scale. Corresponding elements in different drawings are indicated by the same numerals.

DETAILED DESCRIPTION OF THE INVENTION

Figure 1:
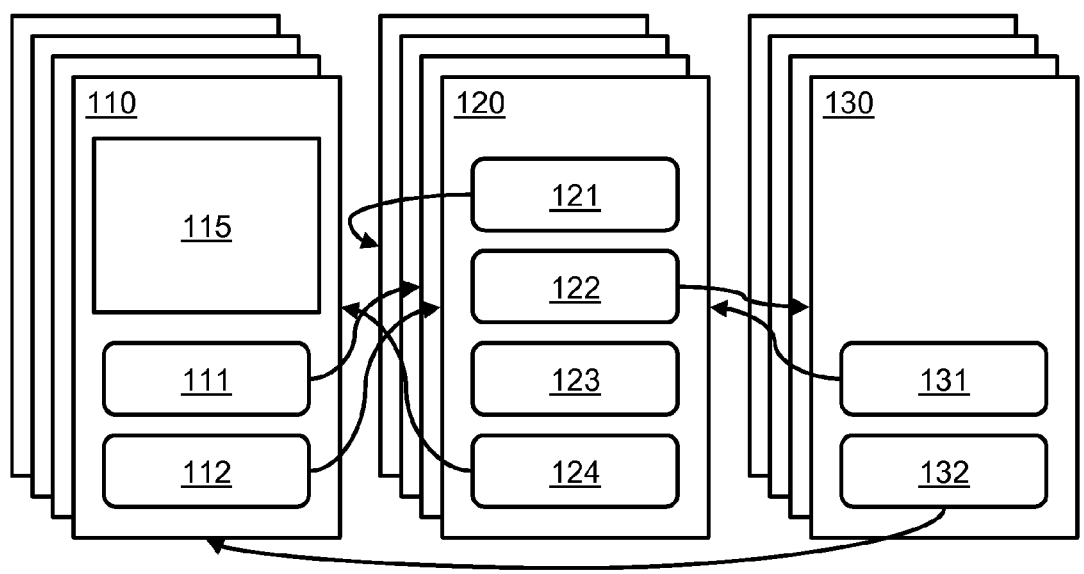
FIG. 1 shows a set of pages in an embodiment of the invention.

FIG. 1 shows a set of pages in an embodiment of the invention. Three distinct sets of pages are shown: publisher pages 110, hosted pages 120, and external pages 130. Publisher pages 110 may constitute for example a preexisting core of the publisher's site, and may be constructed by any known technique. For example, the pages may be manually coded, or generated by a web publishing tool. Publisher pages may be hosted directly by the publisher's organization or by a third party. For the sake of example, in this embodiment it is assumed that the publisher pages 110 are hosted directly by the publisher. Also, it is assumed in this example that the publisher pages may be accessible to users under the publisher's own domain name, such as "publisher.com."

In the example of FIG. 1, a publisher page 110 may contain a news article 115 about a certain event. Publisher page 110 may also contain remote modules 111 and 112, which may link to hosted pages 120 as discussed below. For example, remote module 111 may include a list of topics related to news article 115, such as people or places mentioned in the news article 115. Remote module 112 may instead represent a "search box" that allows the user to search within a set of pages. Of course such combination of modules is only exemplary and not limiting.

Hosted pages 120 may be configured by the publisher and "branded" by the hosting service for the publisher. For example, the publisher may provide to the hosting service a display specification which the hosting service may use to precisely match the appearance of the hosted pages to that of the publisher pages. An example of display specification is a "cascading style sheet," or CSS, which allows the hosting service to add visual effects such as colors and fonts to web pages in a modular fashion. A publisher may simply upload a CSS to the hosting service's site, and the hosting service will include that CSS in all hosted pages 120.

A hosted page 120 may be configured as one or more modules that display custom content. In the example shown in FIG. 1, hosted page 120 includes modules 121, 122, 123 and 124. Module 121 includes a link to another hosted page, whereas module 124 links back to the publisher pages 110. This tends to retain users within the publisher's site. Module 122 links to an external page 130, to augment the site's content by access to external resources. Of course such combination of modules is only exemplary and not limiting.

Although hosted pages 120 may be hosted directly by the hosting service, they may be accessed through a sub-domain within the publisher's domain name, such as "topics.publisher.com." Alternatively, the hosted pages 120 may be accessed through a sub-domain within the hosting service's domain name, such as "publisher.hosting.com" or "hosting.com/publisher." A skilled person may readily envision other naming conventions.

External pages 130 may be hosted by third-party sites which may or may not be related to the publisher's business. These sites may link to either the publisher pages or the hosted pages. For example, external pages 130 may represent independently operated blogs or news-related sites which relate to the main news article 115. In the example of FIG. 1, external pages 130 may contain modules 131 and 132 which display content obtained from the hosting service, and which link back to the hosted pages and the publisher pages, respectively. Such "return links" to the publisher's content may also assist in retaining users and increasing traffic within the publisher's site. Of course such combination of modules is only exemplary and not limiting.

The modules contained within pages 110, 120 and 130 may be correspondingly classified into three groups according to which page they are integrated into. Publisher modules, such as modules 111 and 112, may be configured by the publisher and incorporated into publisher pages. For example, publisher modules may be small, self-contained code fragments that a publisher may physically embed into a publisher page without modification. Hosting service modules, such as modules 121, 122, 123 and 124, may be automatically generated by the hosting service, but may also be selected and configured by the publisher. Hosting service modules may constitute the entire content of a hosted page 120. Shareable modules, such as modules 131 and 132, may be incorporated into third-party sites. Similarly to publisher modules, shareable modules may be small, self-contained code fragments. All of the above modules may preferentially link to publisher pages 110 and hosted pages 120, to further help retain users, however they may also link to third-party sites.

Figure 2:
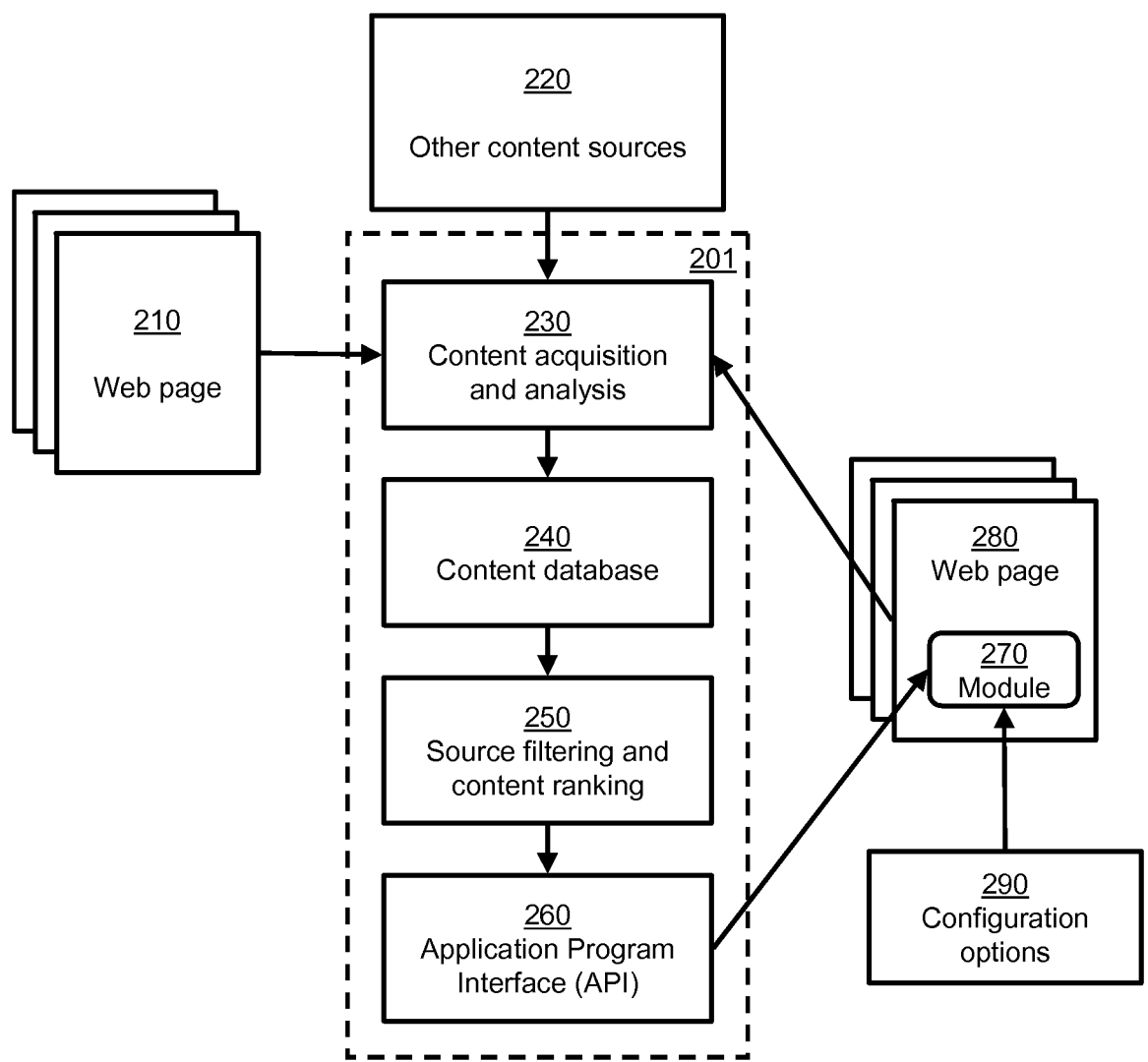
FIG. 2 shows the components of a system and associated data objects in an embodiment of the invention.

FIG. 2 shows the components of a system and associated data objects in an embodiment of the invention. Numeral 201 denotes the system, which may include sub-systems 230, 240, 250 and 260.

Sub-system 230 may perform content acquisition and analysis. This sub-system may retrieve for example a web page 210, and extract the body text and images from it. Sub-system 230 may obtain data inputs from web pages 210 and other content sources 220. The system may locate web pages 210, for example, through notification by RSS feeds, or by "spidering" a site. A module also may automatically generate a notification of the page the module is embedded into. When a module is placed on a page, it may determine an identifier of the page, such as an URL, when the code for the module is first executed. The module may then pass the URL on to the hosting service. The sub-system 230 may then access the page and "scrape" its contents. Web pages 210 may be identified, for example, as containing news-related content. The system may also receive inputs from other content sources 220, for example commercial news provides such as Reuters, the Associated Press, or Getty, or by querying a video search service. Content from sources 220 may be provided through special feeds or dedicated application programming interfaces (APIs).

Sub-system 240 may implement a content database. The text analyzed by sub-system 230 may be represented in a form that allows for rapid retrieval based on calculated similarity to other content and on calculated relevance to pre-defined topics. A unique source identifier may be stored with each content item to allow for filtering. Content database 240 thus provides a collection of generic, pre-indexed content that may be quickly filtered and sorted to build custom pages for inclusion into a publisher's site.

Sub-system 250 may perform source filtering and content ranking. A "source" may be, for example, a specific organization or publication, a blog site, an individual journalist, or a specific RSS feed. Sources may be defined manually as part of content acquisition. Each source is given a unique identifier and stored in the database. For example, all articles from a specific site associated with a given publication may be assigned to the source identifier for that publication.

When performing a query against the content database, source filtering may determine what sources will be used in constructing the results, and source ranking may determine the relative weight of those sources and the order in which they will be presented to the user. This feature may allow modules to preferentially point to pages that maximize the likelihood of user retention and therefore revenue for the publisher. In addition, content may be retrieved from the content database and filtered using either a "white list" of sources to include, or a "black list" of sources to exclude.

Examples of source filters include the following. In one embodiment, only content from the publisher is retrieved. Alternatively, in addition to content from the publisher, content from a set of affiliated sources which are part of the same organization may also be retrieved. As a last example, in addition to content from the publisher, content from a set of sources relevant to an area of interest may be retrieved. For example, the publisher of a site that carries news on a specific industry such as electronic goods might select specific blogs and sources relevant to that industry. The selection may be made by humans or by automated filters. Of course the above examples are only illustrative, and a skilled person may readily envision other filtering algorithms.

In addition to source filtering, sub-system 250 may also implement ranking of sources. For example, even where the filtering algorithm allows the selection of content from all sources, or a selection of sources, publisher pages 110 may be given a higher ranking so that the publisher content may be displayed at the top of the list presented to the user.

Sub-system 260 may implement an application programming interface (API) that may allow for queries to be constructed and transmitted over the internet using a standard set of protocols. Examples of such protocols include, without limitation, Representational State Transfer (REST), Remote Procedure Call (RPC) and SOAP. When constructing a query, a source filtering and/or ranking criterion may also be applied.

The API 260 may be used to build modules 270, which in turn may be integrated into pages 280. Pages 280 may be publisher pages 110, hosted pages 120, or external pages 130. Module 270 may rely upon some predefined configuration options 290 to determine its content, or may automatically determine its content based on the page itself, as discussed more fully below. Once the content-building criteria are defined, a module may submit a set of appropriate queries to the API 260, and retrieve any necessary data. For example, the publisher may provide configuration options 290 that will automatically select generic headline news from a preselected set of sources. When the page 280 is accessed, the module is automatically executed and generates a query that is transmitted to the API 260. The API 260 returns the desired content to module 270, which displays the content within page 280 as if it were part of the page. Instead of or in addition to selecting generic headline news, configuration options 290 may cause module 270 to generate a query for specific content, for example content related to the page that module 270 is embedded into. The generation of the appropriate query may be based on manual input (e.g., a set of keywords may be associated with each page) and/or by automatic analysis of the page.

Configuration options 290 may include any configuration data that may be used to define the appearance and functionality of a module 270. Configuration data may include, for example, display specifications (color, branding, etc.); content specifications (topic, number of items to display, date range, etc.); source specifications (white lists and black lists, source ranking, etc.). These are passed to the module by the page containing the module. Some of the configuration options 290 may coexist with the publisher pages, others may be stored by the hosting service.

Modules residing on the publisher site may be customized and incorporated using standard protocols just as javascript or HTML frames, in a manner similar to how advertisements might be placed on a conventional web page. Such customization and integration may not necessarily require significant expertise to use the API, and may therefore be fully automated, making the entire solution self-served, allowing the addition of inventory without the need to configure new pages hosted by the publisher. If however the hosted pages are to appear as a subdomain of the publisher's site (e.g. topics.publisher.com instead of publisher.hosting.com or hosting.com/publisher), redirecting requests for that domain may involve an additional step by the publisher.

In certain embodiments of the invention, examples of modules may include, without limitation, the following:
1. Latest news for a topic;
2. Historical news for a topic;
3. Photos related to a topic, as a slideshow or montage;
4. Video related to a topic;
5. Quotes about a topic;
6. Quotes by a topic, if the topic represents a person;
7. Persons and organizations associated with a topic, with or without images;
8. Other topics associated with a topic;
9. A graph of news volume for a topic;
10. A map showing locations mentioned by a topic;
11. Blog posts about a topic;
12. User comments about a topic;
13. Advertisements;
14. A search form, for searching additional news from within the displayed topic or across all news;
15. User-authored modules that use a combination of public APIs to generate content, that may or may not utilize the API (for example, a module that uses data from another site).

The terms "related to" and "about" a topic may mean, without limitation, any of the following:
1. News that mentions a person, location, place, or other entity, as determined using an algorithm for extracting named entities from a content item, for which there are many well-known implementations;
2. All news from a specific source, set of sources, or all sources. For example, a set of pharmaceutical blogs and news sites might constitute a "pharmaceuticals" topic, and the set of all news sources might constitute a "world news" topic;
3. News matching a Boolean search expression, for which there are many well-known implementations;
4. News assigned by through a machine-learning technique and trained by example, for which there are many well-known implementations;
5. News algorithmically matched to the content on the page, based on extraction of the text of the page, extraction of named entities mentioned, and calculation of term-based similarity and entity co-occurrence with other items in the hosting service content database, as detailed below in FIG. 3.

In the example of FIG. 2, a module's content may be defined by configuration options 290. However a module 270 may be embedded in a page 280 and its content may be automatically related to the content on the page. This is especially advantageous when a module is embedded within a publisher page or an external page. For example, a publisher may install on all publisher pages a generic module that pulls in "related topics." To determine what is "related," the content of the web page, excluding the module, may be "scraped" and analyzed by the content acquisition and analysis module 230. Alternatively, only a sufficient fraction of a page may be analyzed to extract enough information and perform a query for related content. To accommodate this type of use, the module may request content from the API 260 by passing an identifier of the containing page 280, for example the URL of the page. In this case the module 270 may never require any information about the page 280 in order to generate a query to request content from the API 260.

Figure 3:
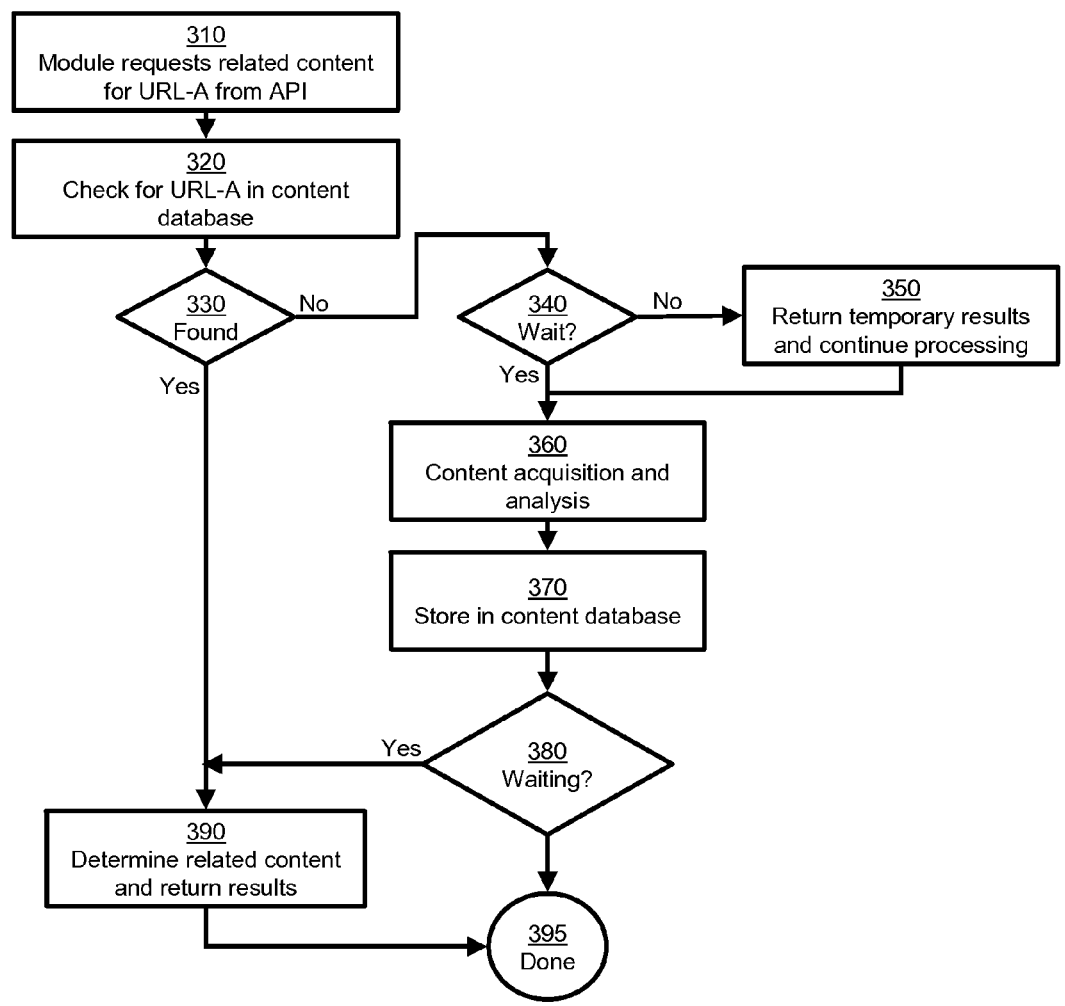
FIG. 3 shows a process for retrieving content in an embodiment of the invention.

FIG. 3 shows a process for retrieving content in an embodiment of the invention. The process may start at step 310, where a module may request related content for a particular URL (URL-A) from the API. The URL may either be set by the page and passed to the module, or the HTTP referer, part of the HTTP protocol definition and available in the request header, may be used to determine the page which contains the module.

At step 320, URL-A may be checked for in the content database, to determine whether it has already been processed. At step 330, a test may be performed on whether URL-A has been found in the content database. If URL-A is found in the database, the method may return related content immediately by proceeding to step 390. If URL-A is not found in the database, the method may proceed to step 340.

At step 340, the method may perform another test on whether to wait until processing is complete to return a result, or whether to return a temporary result immediately and process URL-A in preparation for future requests for related content. The decision may be based, for example, on module preferences; publisher-specific priorities; or a decision made by the hosting service to defer or immediately process such requests. If no wait is selected, at step 350, the method may return temporary results, which may be based on a default parameter provided as part of the module request, or may be top news or some other hosting-service-defined default means of retrieving content. If instead a wait is determined at step 340, the method may proceed to step 360.

At step 360, the method may perform content acquisition and analysis, as discussed in reference to element 230 in FIG. 2. At step 370, the method may store the acquired content in the content database, as discussed in reference to element 240 in FIG. 2.

At step 380, the method may determine whether the module is waiting for a response, as previously determined in step 340. If the module is not waiting, the method may directly terminate at step 395. If the module is waiting, the method may proceed to step 390, and determine related content and return results. There are numerous methods for returning related content, depending upon the module type, as discussed previously in reference to the various types of modules disclosed. The method may then terminate at step 395.

Figure 4:
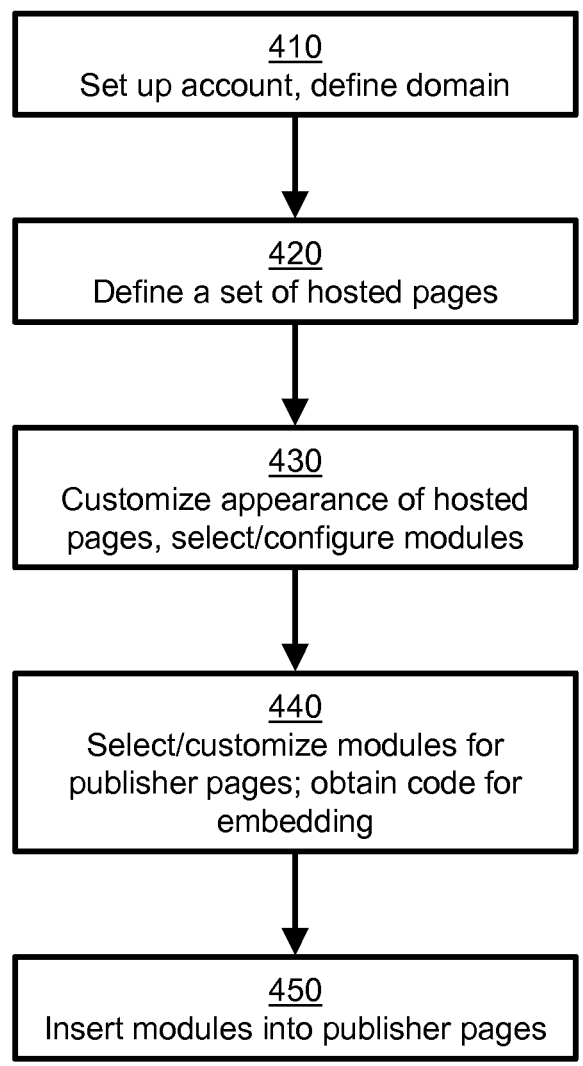
FIG. 4 shows a method for configuring a service in an embodiment of the invention.

FIG. 4 shows a method for configuring a service in an embodiment of the invention. The method may start at step 410, where the account may be set up and the domain names may be defined. For example, as discussed above, a publisher with domain name publisher.com may define a domain name topics.publisher.com.

At step 420, a set of hosted pages may be defined. Pages may be created based on specific topics, or news stories, or whatever theme may be convenient or desirable. As an example, the publisher of a sports-related site may create a page dedicated to each sports team. The publisher of a politics-related site may set up a page for each candidate to a certain election. Once set up, hosted pages may have their own static address, such as an URL, so that they may be bookmarked by users. Also, static pages may be captured by a search engine and included within a list of search results presented to users, which further increases traffic toward the publisher's site. However, the content of each page need not be static, but may evolve, if for example the page includes a "latest news" module that is continuously, automatically updated to include new content.

At step 430, the appearance of the hosted pages may be customized, and modules may be selected and configured. Modules may include any of the module types described above, such as latest news, photos, related blog posts, etc. At this time the appearance of the hosted pages may be customized, for example by uploading a CSS. The specific selection, customization and arrangement of modules may define the page as perceived by the users, and may be updated periodically, when for example the publisher's site is redesigned.

At step 440, modules may be selected and customized for use in publisher pages. The procedure may be the same as for the selection and customization of modules for hosted pages, or it may be modified to better suit the different needs of publisher pages. Also at step 440, code may be obtained for embedding into such publisher pages. Examples of code that may be embedded into a page includes HTML and Javascript.

At step 450, modules may be inserted into publisher pages by known techniques. The same procedure described with respect to publisher pages in steps 440 and 450 may be applied to external pages, so that modules may be provided to third parties for inclusions in their own pages. This allows traffic from those third-party sites to be redirected to the publisher's site, further increasing revenue.

It is apparent that the procedure described in FIG. 4 may be entirely performed on the publisher's side, similarly to a self-served publishing tool. The creation of a domain, the creation of hosted pages, and the selection and customization of modules may be implemented, for example, by a graphical user interface, so that all the publisher of a site has to do is embed small modules into his or her own pages.

While the invention has been described in conjunction with specific embodiments, it will be appreciated that such embodiments are not limiting. Accordingly, numerous alternatives, modifications, and variations are possible within the scope of the appended claims.

We claim:

1. A computer-implemented method for augmenting a site with additional pages, executed on at least one processor, method comprising the steps of:
   receiving, at a first computer, a display specification, wherein the display specification provides visual effect modifications to a page;
   generating, at a second computer, a plurality of pages based on the display specification;
   receiving, at the second computer, a query from a module hosted on the site;
   generating, at the second computer, a list of pages selected from the plurality of pages based on the query, the list of gages including data responsive to the query; and
   transmitting, from the second computer, the list of pages to the module.

2. The computer-implemented method for augmenting a site with additional pages according to claim 1, further including:
   hosting, at the second computer, the plurality of pages.

3. A computer-implemented method for augmenting a site with additional pages, executed on at least one processor, the method comprising the steps of:
   receiving, at a first computer, a display specification;
   generating, at a second computer, a plurality of pages based on the display specification;
   receiving, at the second computer, a query from a module hosted on the site;
   generating, at the second computer, a list of pages selected from the plurality of pages based on the query; and
   transmitting, from the second computer, the list of pages to the module, wherein the query includes a filtering specification, and the list of pages is generated based on the filtering specification.

4. A computer-implemented method for augmenting a site with additional pages, executed on at least one processor, the method comprising the steps of:
   receiving, at a first computer, a display specification;
   generating, at a second computer, a plurality of pages based on the display specification;
   receiving, at the second computer, a query from a module hosted on the site, wherein the query includes an identifier of a page which includes the module;
   acquiring, at the second computer, content from the pages and analyzing at least part of the content to obtain a filtering specification;

generating, at the second computer, a list of pages selected from the plurality of pages based on the queries, wherein the list of pages is generated based on the filtering specification; and transmitting, from the second computer, the list of pages to the module.

5. A computer-implemented system executed on at least one processor for augmenting a site with additional pages, the system comprising:

a content database on a first computer for storing generic content;

a filtering module on the first computer in communication with the content database, the filtering module generating custom content from the generic content based on a filtering specification; and an interface module on the first computer in communication with the filtering module, the interface module receiving the content specification and a display specification from the site, the site hosted on a second computer, and generating, on the first computer, a custom page based on the custom page content and the display specification; and wherein the display specification provides visual effect modifications to a page.

\* \* \* \* \*